US011983420B2

(12) United States Patent
Lin (10) Patent No.: US 11,983,420 B2
(45) Date of Patent: May 14, 2024

(54) METHOD AND SYSTEM FOR PROTECTING DATA IN EXTERNAL MEMORY BASED ON ISOLATED EXECUTION ENVIRONMENT

(71) Applicant: Nuvoton Technology Corporation, Hsinchu Science Park (TW)

(72) Inventor: Zong-Min Lin, Kaohsiung (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 34 days.

(21) Appl. No.: 17/843,046

(22) Filed: Jun. 17, 2022

(65) Prior Publication Data

US 2023/0409211 A1    Dec. 21, 2023

(51) Int. Cl.
*G06F 3/06* (2006.01)
(52) U.S. Cl.
CPC .......... *G06F 3/0622* (2013.01); *G06F 3/0659* (2013.01); *G06F 3/0679* (2013.01)

(58) Field of Classification Search
CPC ..... G06F 3/0622; G06F 3/0659; G06F 3/0679
See application file for complete search history.

(56) References Cited

U.S. PATENT DOCUMENTS

| 2010/0281273 A1* | 11/2010 | Lee ........................ G06F 21/72 |
| | | 713/193 |
| 2020/0371966 A1* | 11/2020 | Parker ................. G06F 12/1491 |
| 2021/0273815 A1* | 9/2021 | Enke ..................... G06F 21/602 |

* cited by examiner

*Primary Examiner* — Edward J Dudek, Jr.
(74) *Attorney, Agent, or Firm* — Muncy, Geissler, Olds & Lowe, P.C.

(57) ABSTRACT

A method for protecting data in an external memory based on an isolated execution environment is provided. The method is used in a processor in the isolated execution environment of a system-on-a-chip. The method includes: accessing an output command of a main system processor in a main system of the system-on-a-chip; reading first data from a shared memory in the main system according to the output command; encrypting the first data with a private key and generating encrypted first data; and outputting the encrypted first data to the external memory.

7 Claims, 10 Drawing Sheets

METHOD AND SYSTEM FOR PROTECTING DATA IN EXTERNAL MEMORY BASED ON ISOLATED EXECUTION ENVIRONMENT

BACKGROUND

Technical Field

The present disclosure generally relates to a method and a system for protecting external memory data. More specifically, aspects of the present disclosure relate to a method and a system for protecting data in an external memory based on an isolated execution environment.

Description of the Related Art

Usually, there are not enough memory components inside the chip of a microprocessor, so the microprocessor may be equipped with memory components located outside the chip, such as a dynamic random access memory (DRAM), for additional storage space. The temporary data used by the microprocessor during operation will be stored in the external memory device.

However, the data stored outside the chip are easier targets for malicious attacks. Compared to the data stored in the storage space inside the chip, the data stored outside the chip is easier to be stolen by probes, and the data can be easily damaged.

Therefore, it is necessary to ensure the security of data stored outside of chips, through some mechanisms.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and a system for protecting data in an external memory based on an isolated execution environment to overcome the above disadvantages.

In an exemplary embodiment, a method for protecting data in an external memory based on an isolated execution environment is provided. The method is used in a processor located in the isolated execution environment of a system-on-a-chip. The method comprises: accessing an output command of a main system processor in a main system of the system-on-a-chip; reading first data from a shared memory in the main system according to the output command: encrypting the first data with a private key and generating encrypted first data; and outputting the encrypted first data to the external memory.

In some embodiments, the method further comprises: calculating the first hash value of the first data; and recording the first hash value in a random access memory of the isolated execution environment.

In some embodiments, before the processor accesses the output command, the method further comprises: accessing an initialization command issued by the main system processor; accessing at least one true random number generator (TRNG) located in the isolated execution environment according to the initialization command to generate a random number; generating the private key according to the random number: storing the private key in a random access memory in the isolated execution environment; and reporting a completion message to the main system processor.

In some embodiments, the method further comprises: accessing a read command in the main system processor; reading encrypted second data from the external memory according to the read command; decrypting the encrypted second data using the private key to generate second data; and sending the second data to the shared memory in the main system.

In some embodiments, the method further comprises: calculating a second hash value of the second data; comparing the second hash value with a third hash value corresponding to the second data recorded in the random access memory, and generating a comparison result; and when the comparison result is incorrect, invaliding the second data and reporting an error message to the main system processor.

In some embodiments, the method further comprises: accessing a program load command in the main system processor; loading a program from the host system into a random access memory of the isolated execution environment according to the program load command: authenticating the program using an authentication key and generating an authentication result; and loading and executing the program when the authentication result matches a program signature.

In an exemplary embodiment, a system for protecting data in an external memory based on an isolated execution environment is provided. The system comprises a main system, a shared memory and an isolated execution environment. The main system comprises a main system processor. The shared memory is coupled to the main system processor. The isolated execution environment is coupled to the main system and comprises a processor. The processor executes the following steps: accessing an output command of the main system processor: reading first data from a shared memory in the main system according to the output command: encrypting the first data with a private key and generating encrypted first data; and outputting the encrypted first data to the external memory.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Embodiments of the present disclosure provide a method and system for protecting data in an external memory by using an isolated execution environment (IEE) to a system-on-a-chip (SoC). The isolated execution environment in the system-on-a-chip is a system that can operate independently from the main operating system. The isolated execution environment has processor-executable programs and a dedicated memory to store temporary data. In addition, the isolated execution environment further comprises a random number generator to generate pure random numbers. Devices in the isolated execution environment may only be used by the processors in the isolated execution environment to achieve the purpose of isolating from the operation of the main system and protecting the data in the external memory.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims. Furthermore, in the following detailed description of the embodiments of the present disclosure, numerous specific details are set forth in order to provide a thorough understanding of the present disclosure. It will be apparent, however, to one skilled in the art, that the present disclosure may be practiced without some or all of these specific details. In other instances, well known methods, steps components and circuits have not been described in detail in order to not unnecessarily obscure the present disclosure.

Symbols and Terms

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "reading," "calculating," "storing," "recording," "determining," "generating," "authenticating," "reporting," or the like, refer to actions and processes (e.g., flowcharts of FIGS. 2, 4, 6A~6B and 7) of a computer system or similar electronic computing device or a processor (e.g., a system-on-a-chip of FIGS. 1, 3 and 5). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

Figure 1:
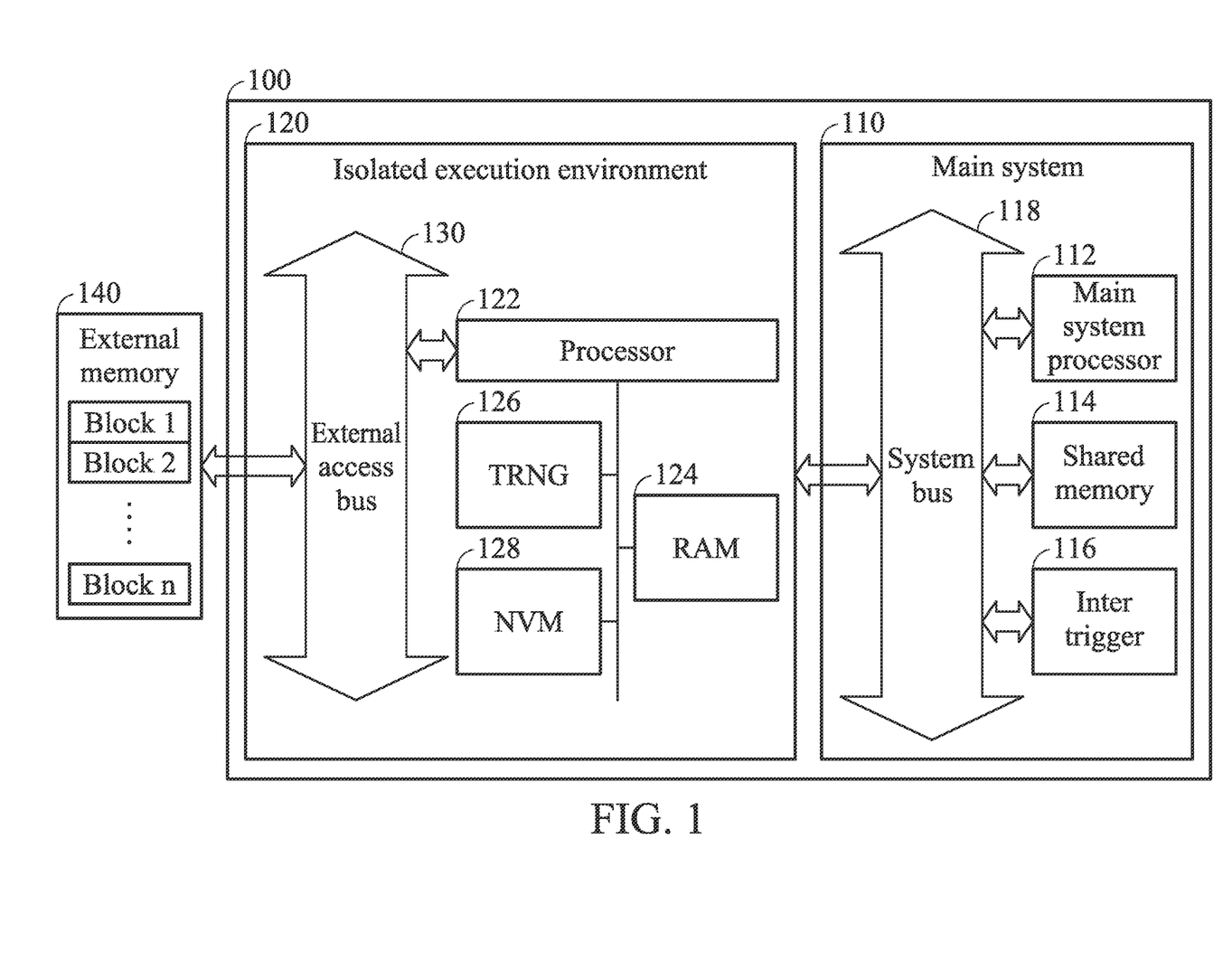
FIG. 1 is a structural diagram of a system-on-a-chip according to an embodiment of the present disclosure.

FIG. 1 is a structural diagram of a system-on-a-chip 100 according to an embodiment of the present disclosure. The system-on-a-chip 100 broadly represents any single-processor or multi-processor computing device capable of executing computer-readable instructions or a system capable of executing computer-readable instructions. Examples of the system-on-a-chip 100 include, but are not limited to, workstations, laptops, client terminals, servers, distributed computing systems, handheld devices, or any other computing system or device. In its most basic configuration, the system-on-a-chip 100 may include at least one main system 110 and an isolated execution environment 120 of an embodiment of the present disclosure. The main system 110 may store data in blocks 1 to n of an external memory 140 located outside the system-on-a-chip 100 through the isolated execution environment 120.

The main system 110 at least comprises a main system processor 112, a shared memory 114, an inter trigger 116 and a system bus 118, wherein the main system processor 112, the shared memory 114 and the inter trigger 116 are coupled to the system bus 118.

The isolated execution environment 120 is coupled to the system bus 118, and at least comprises a processor 122, a random access memory (RAM) 124, and a true random number generator (TRNG) 126, a non-volatile memory (NVM) 128 and an external access bus 130, wherein the processor 122 is coupled to the random access memory 124, the true random number generator 126, the non-volatile memory 128, and the external access bus 130.

The main system processor 112 generally represents any type or form of processing unit capable of processing data or interpreting and executing instructions. In the embodiment, the main system processor 112 is the processor that provides the main functions in the system-on-a-chip 100. In certain embodiments, the main system processor 112 may receive instructions from a software application or module. These instructions may cause the main system processor 112 to perform the functions of one or more of the example embodiments described and/or illustrated herein.

The shared memory 114 generally represents any type or form of volatile or non-volatile storage device or medium capable of storing data and/or other computer-readable instructions. Examples of the shared memory 114 include, but are not limited to, a random access memory (RAM), a read-only memory (ROM), a flash memory, or any other suitable memory device. The shared memory 114 may be accessed by the main system processor 112 and the processor 122 in the isolated execution environment 120 for data exchange. In addition, the shared memory 114 may provide a temporary storage space for storing data to be placed in the external memory 140 and data read from the external memory 140.

The inter trigger 116 mainly triggers and handles the communication between the main system processor 112 and the processor 122 in the isolated execution environment 120. The inter trigger 116 can be accessed by the processor 122 in the isolated execution environment 120 to issue a notification signal that is used to instruct the main system processor 112. The inter trigger 116 can also be accessed by the main system processor 112 to issue a notification signal that is used to instruct the processor 122 in the isolated execution environment 120.

The processor 122 in the isolated execution environment 120 is mainly used to execute programs, wherein the programs include at least executable modern cryptographic algorithms. The cryptographic algorithms include, but are not limited to, the Advanced Encryption Standard (AES) of the symmetric encryption algorithm, and the Secure Hash Algorithm (SHA) of the hash value operation. Additionally, the processor 122 may execute programs stored in the non-volatile memory 128 in the isolated execution environment 120 or may execute programs loaded into the non-volatile memory 128 from the main system processor 112. In one embodiment, the processor 122 needs to perform a secure boot process during the process of loading the programs from the main system 110 to the non-volatile memory 128 to confirm the integrity and authenticity of the programs.

The true random number generator 126 is used to generate random numbers, and the true random number generator 126 may only be accessed by the processor 122 in the isolated execution environment 120.

The random access memory 124 can store programs loaded by the processor 122 from the main system 110, a hash value of each data stored in the external memory 140, and a private key used to encrypt the data. The random access memory 124 may only be accessed by the processor 122 in the isolated execution environment 120.

The non-volatile memory 128 is used to store programs to be executed by the processor 122 by default, and the non-volatile memory 128 may only be accessed by the processor 122 in the isolated execution environment 120.

The external access bus 130 is used to enable the processor 122 in the isolated execution environment 120 to access the external memory 140, and the external access bus 130 may only be accessed by the processor 122 in the isolated execution environment 120.

Figure 2:
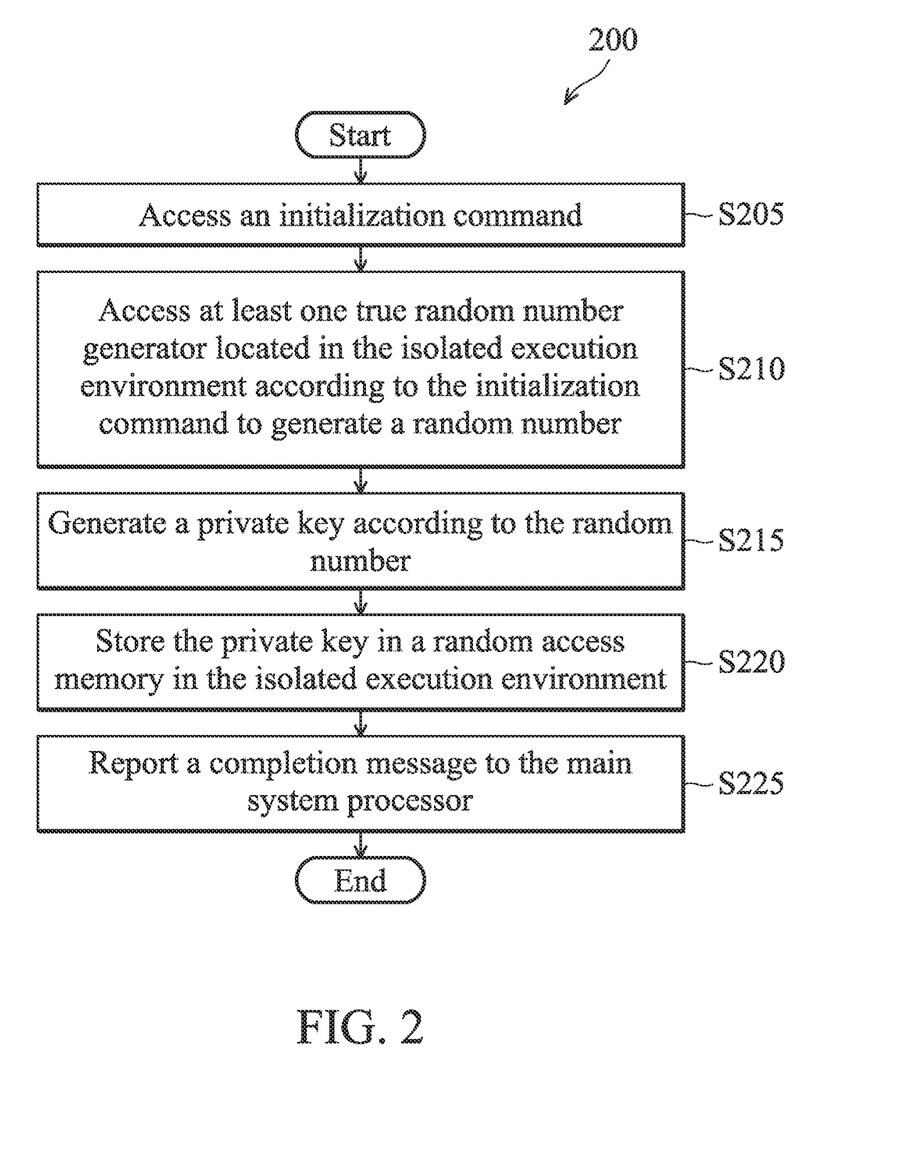
FIG. 2 is a flowchart of a method of initialization procedure in the isolated execution environment according to an embodiment of the present disclosure.

FIG. 2 is a flowchart 200 of a method of initialization procedure in the isolated execution environment according to an embodiment of the present disclosure. The method may be performed by the processor 122 in the isolated execution environment 120 as shown in FIG. 1.

It should be noted that the initialization procedure is a process of establishing a system session stage, wherein the real random number generator 126 in the isolated execution environment is used to generate a random number, and use the random number as a seed for generating a session key. Next, the processor 122 performs a corresponding key generation algorithm to generate a conference key (i.e., a private key), and stores the conference key in the isolated execution environment 120. The initialization procedure is as follows:

In step S205, the processor 122 accesses an initialization command. Specifically, the main system processor 112 may first issue the initialization command to notify the processor 122. The processor 122 accesses the initialization command through the inter trigger 116.

Next, in step S210, the processor 122 accesses at least one true random number generator 126 located in the isolated execution environment 120 according to the initialization command to generate a random number.

In step S215, the processor 122 generates a private key according to the random number. Next, in step S220, the processor 122 stores the private key in a random access memory 124 in the isolated execution environment 120.

In step S225, the processor 122 reports a completion message to the main system processor 112. Specifically, the processor 122 returns a completion message of the initialization processes to the main system processor 112 by accessing the inter trigger 116.

Figure 3:
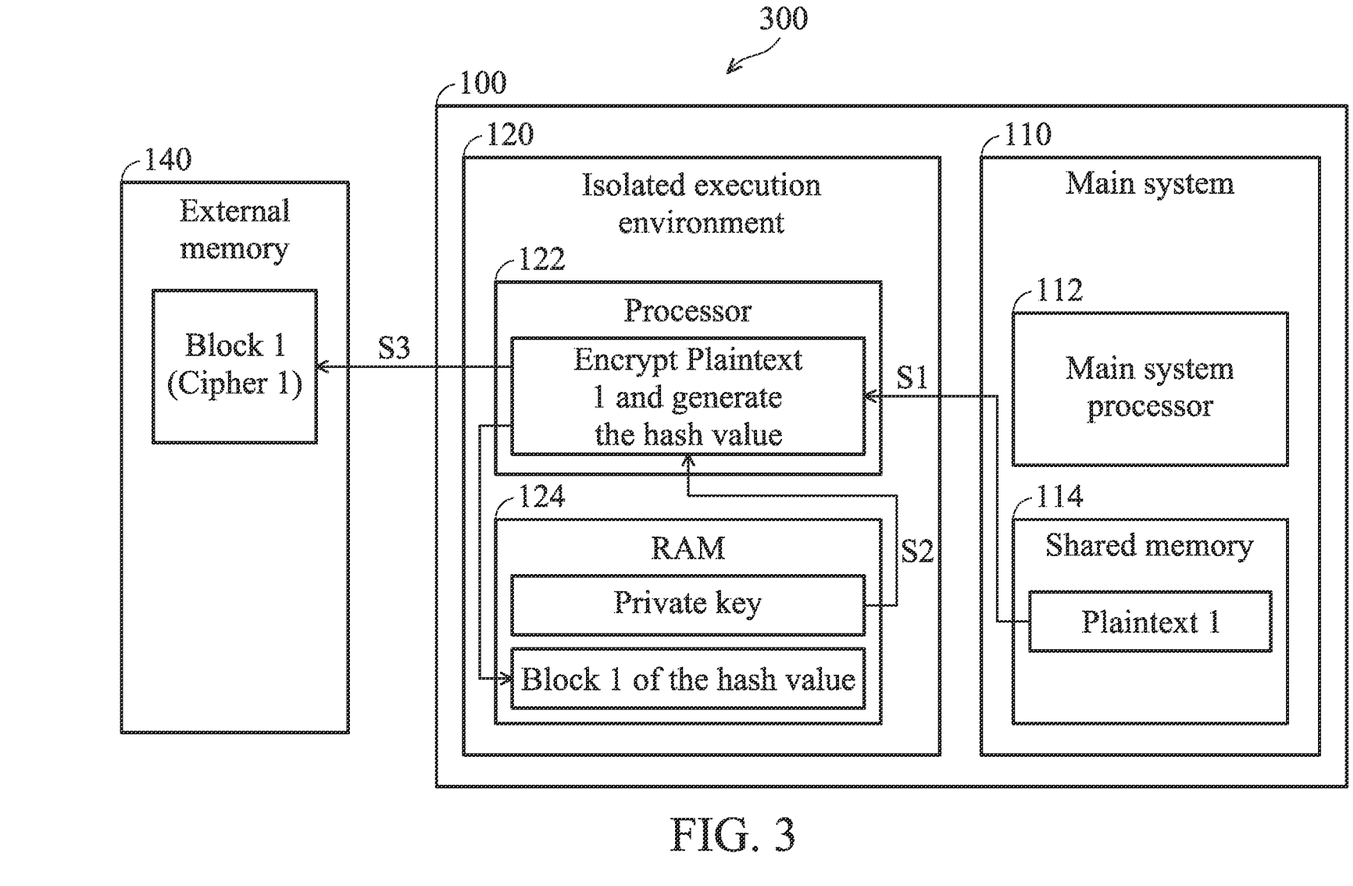
FIG. 3 is a simplified schematic diagram of a system for protecting data in an external memory based on an isolated execution environment according to an embodiment of the present disclosure.

FIG. 3 is a simplified schematic diagram of a system 30) for protecting data in an external memory based on an isolated execution environment according to an embodiment of the present disclosure. The components of the system 300 having the same name as described in FIG. 1 have the same function, so details related to the functions of the components will be omitted. For the convenience of description, the main system 110 and the isolated execution environment 120 in the system 300 only show some components. Those skilled in the art will understand that the main system 110 and the isolated execution environment 120 in FIG. 3 are the same as those in FIG. 1.

FIG. 3 illustrates how the processor 122 of the isolated execution environment 120 outputs the first data to the external memory 140, wherein the output process is an encryption process. The output process of outputting the first data is as follows:

In step S1, the processor 122 of the isolated execution environment 120 reads the first data Plaintext 1 from the shared memory 114 of the main system 110, wherein the unit of the first data Plaintext 1 is a predefined block.

Next, in step S2, the processor 122 encrypts the first data (Plaintext 1) using a private key stored in the random access memory 124, and calculates the hash value of the first data (Plaintext 1) before encryption and records the hash value in the block 1 of the random access memory 124.

In step S3, the processor 122 outputs the encrypted first data (Cipher 1) to the block 1 of the external memory 140 for storage through the external access bus.

Figure 4:
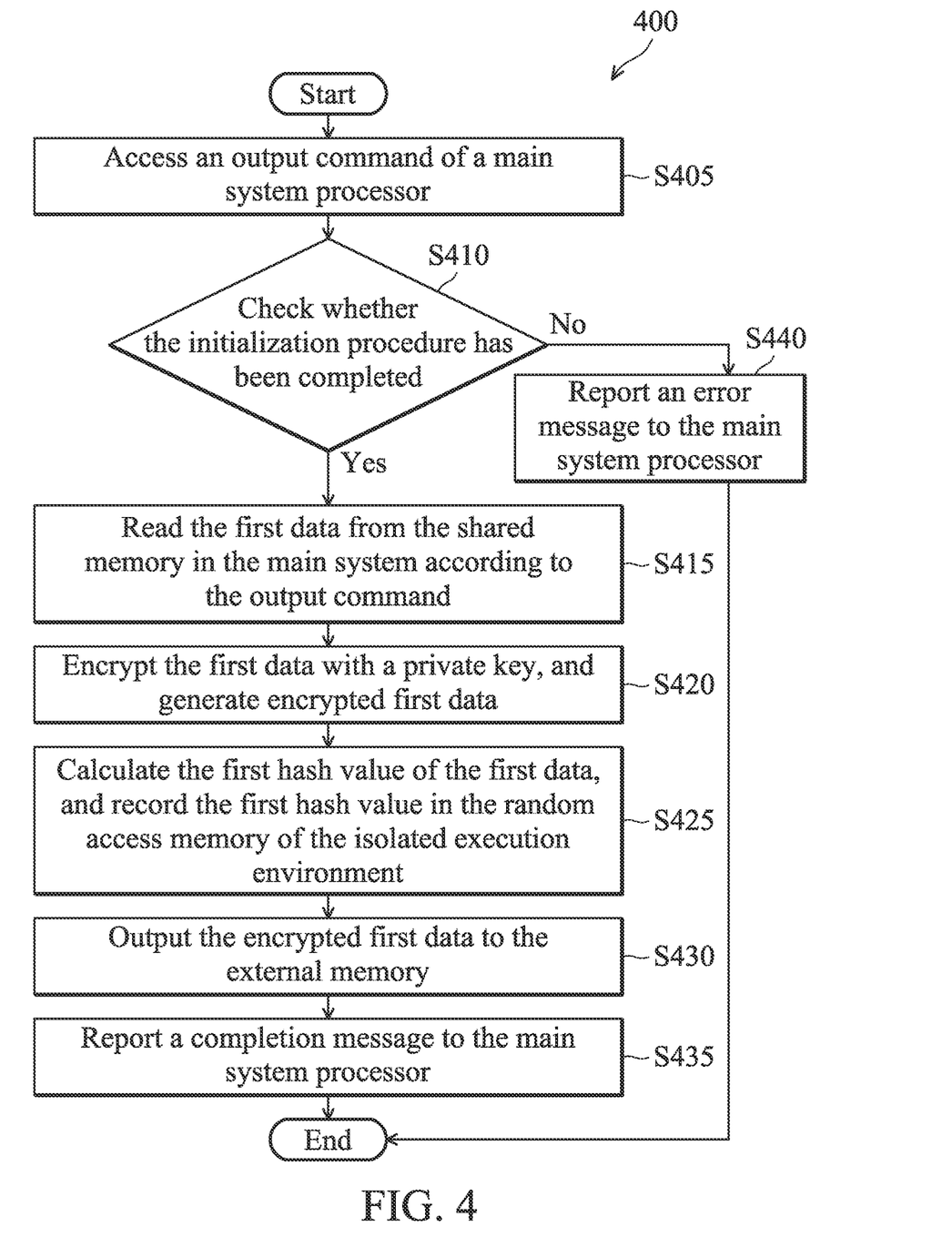
FIG. 4 is a flowchart of a method for protecting data in an external memory based on an isolated execution environment according to an embodiment of the present disclosure.

FIG. 4 is a flowchart 400 of a method for protecting data in an external memory based on an isolated execution environment according to an embodiment of the present disclosure. The flowchart 400 further illustrates the process of FIG. 3, and the method may be used in the system-on-a-chip 100 of FIG. 1 or the system 300 of FIG. 3.

In step S405, the processor 122 in the isolated execution environment 120 accesses an output command of a main system processor. Specifically, the main system processor 112 may first issue an output command to notify the processor 122. The processor 122 accesses the output command through the inter trigger 116.

In step S410, the processor 122 checks whether the initialization procedure has been completed. When the processor 122 checks that the initialization procedure has been completed ("Yes" in step S410), in step S415, the processor 122 reads the first data from the shared memory 114 in the main system 110 according to the output command.

Next, in step S420, the processor 122 encrypts the first data with a private key, and generates encrypted first data. In step S425, the processor 122 calculates the first hash value of the first data, and records the first hash value in the random access memory 124 of the isolated execution environment 120.

Next, in step S430, the processor 122 outputs the encrypted first data to the external memory 140 through the external access bus 130. In step S435, the processor 122 reports a completion message to the main system processor 112 by accessing the inter trigger 116, wherein the completion message indicates that the output process of the first data is completed.

When the processor 122 checks that the initialization procedure is not completed ("NO" in step S410), in step S440, the processor 122 reports an error message to the main system processor 112 by accessing the inter trigger 116.

Figure 5:
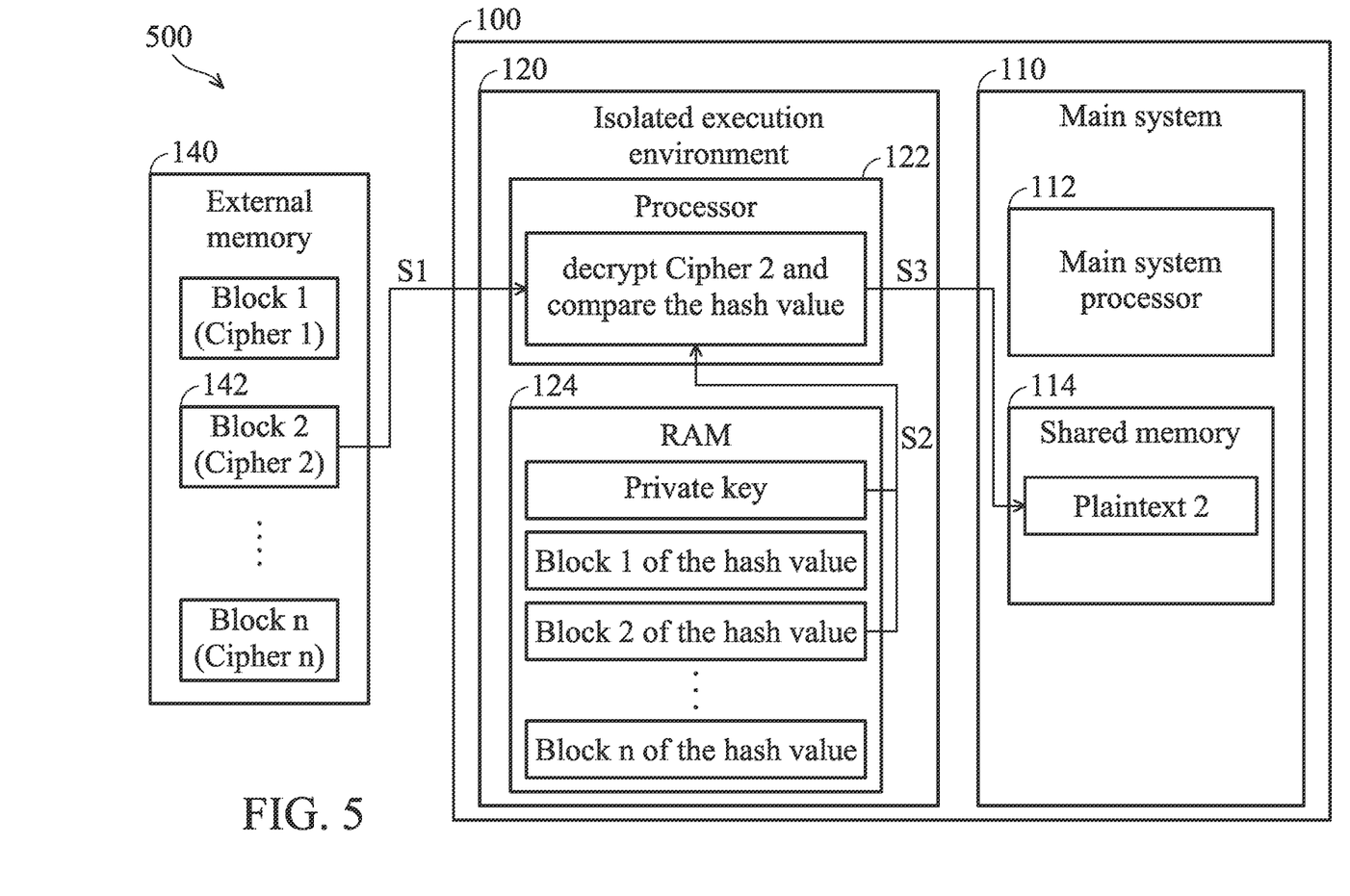
FIG. 5 is a simplified schematic diagram of a system for protecting data in an external memory based on an isolated execution environment according to an embodiment of the present disclosure.

FIG. 5 is a simplified schematic diagram of a system 500 for protecting data in an external memory based on an isolated execution environment according to an embodiment of the present disclosure. The components of the system 500 having the same name as described in FIG. 1 have the same function, so details related to the functions of the components will be omitted. For the convenience of description, the main system 110 and the isolated execution environment 120 in the system 500 only show some components. Those skilled in the art will understand that the main system 110 and the isolated execution environment 120 in FIG. 3 are the same as those in FIG. 1.

FIG. 5 illustrates how the processor 122 of the isolated execution environment 120 reads the second data from the external memory 140 into the shared memory 114 of the main system 110, wherein the read process is a decryption process. The process of reading the second data is as follows:

In step S1, the processor 122 of the isolated execution environment 120 reads the encrypted second data (Cipher 2) 142 located in the block 2 from the external memory 140 through the external access bus 130, wherein the unit of the encrypted second data 142 is a predefined block.

In step S2, the processor 122 decrypts the encrypted second data 142 using a private key stored in the random access memory 124 of the isolated execution environment 120, and calculates the second hash value of the decrypted second data 142.

In step S3, the processor 122 outputs the second data (Plaintext 2) to the shared memory 114 of the main system 110.

Figure 6A:
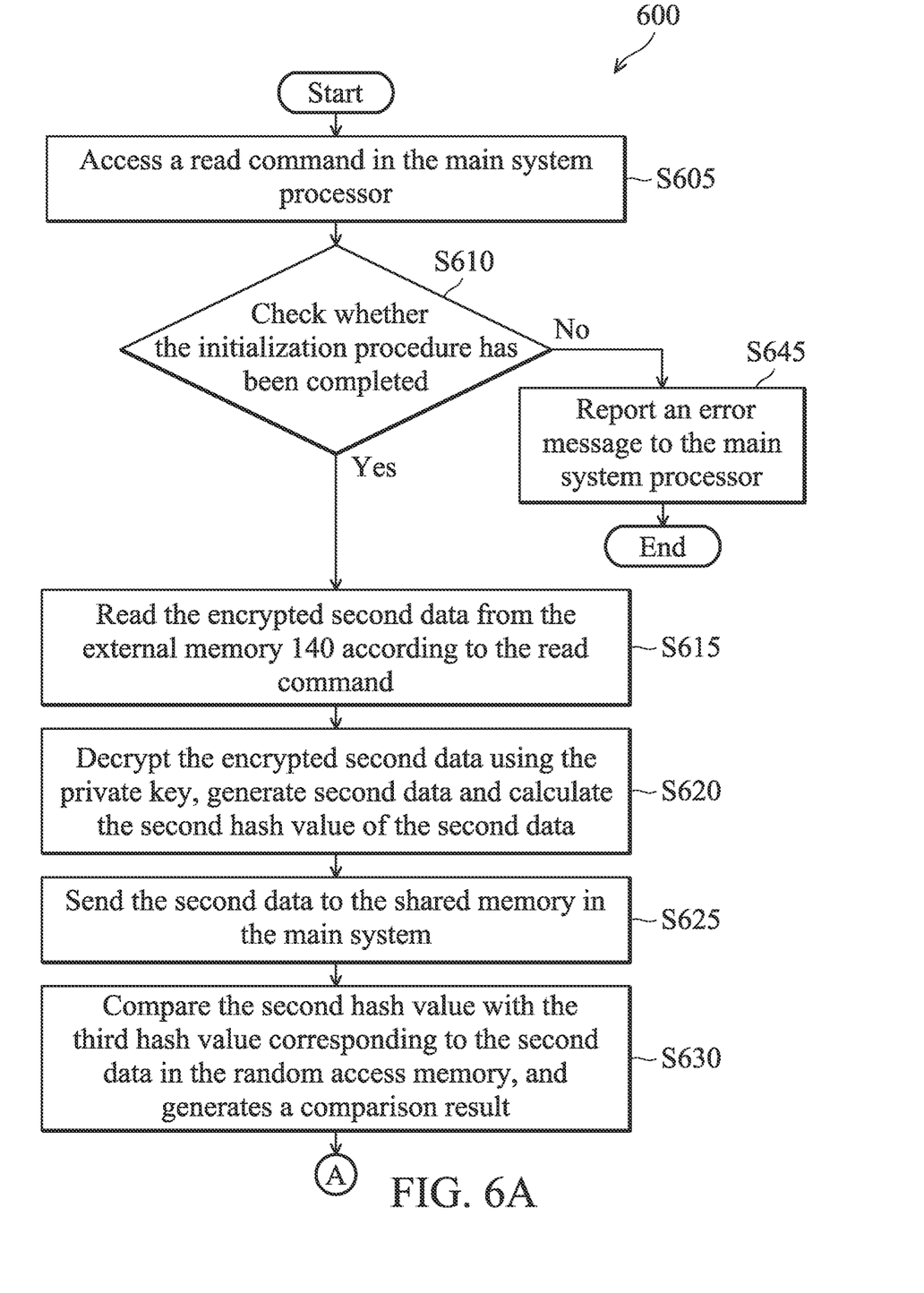
FIGS. 6A-6B show a flowchart of a method for protecting a data in the external memory based on an isolated execution environment according to an embodiment of the present disclosure.
Figure 6B:
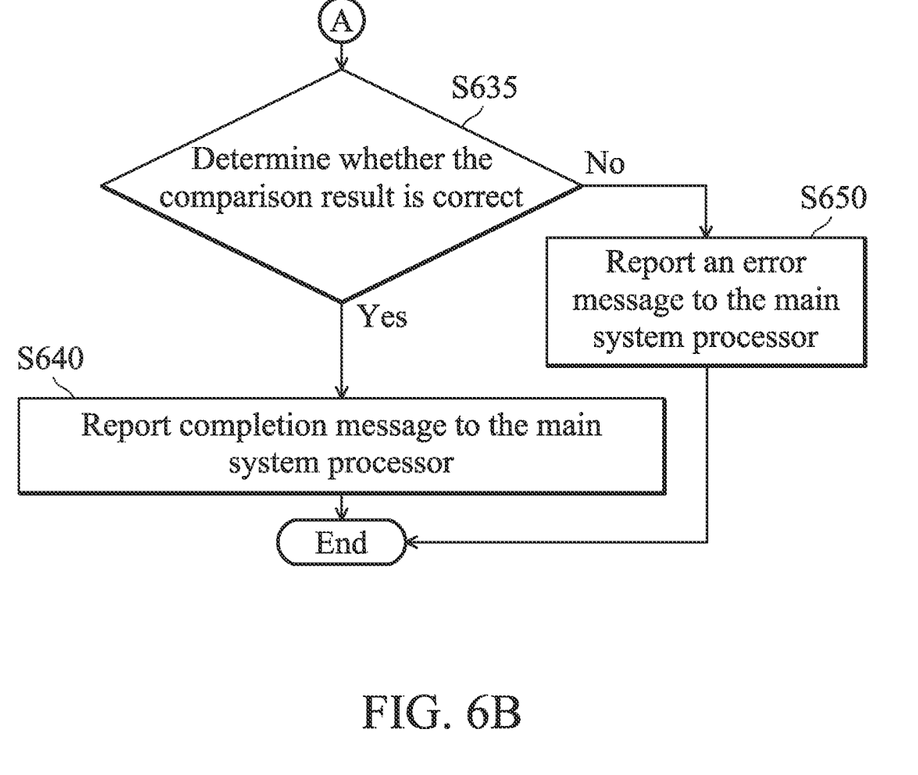

FIGS. 6A-6B show a flowchart 600 of a method for protecting a data in the external memory based on an isolated execution environment according to an embodiment of the present disclosure. The flowchart 600 further illustrates the process of FIG. 5, and the method may be used in the system-on-a-chip 100 of FIG. 1 or the system 300 of FIG. 3.

In step S605, the processor 122 in the isolated execution environment 120 accesses a read command in the main system processor 112. Specifically, the main system processor 112 first issues a read command to notify the processor 122. The processor 122 accesses the read command through the inter trigger 116.

In step S610, the processor 122 checks whether the initialization procedure has been completed. When the initialization process has been completed ("Yes" in step S610), in step S615, the processor 122 reads the encrypted second data from the external memory 140 according to the read command. When the initialization process is not completed ("No" in step S610), in step S645, the processor 122 reports an error message to the main system processor 112 by accessing the inter trigger 116.

Next, in step S620, the processor 122 decrypts the encrypted second data using the private key, generates a second data and calculates the second hash value of the second data. In step S625, the processor 122 sends the second data to the shared memory 114 in the main system 110.

Next, in step S630, the processor 122 compares the second hash value with the third hash value corresponding to the second data in the random access memory 124, and generates a comparison result. In step S635, the processor 122 determines whether the comparison result is correct (i.e., whether the second hash value is equal to the third hash value).

When the processor 122 determines that the comparison result is correct (i.e., the second hash value is equal to the third hash value) ("Yes" in step S635), in step S640, the processor 122 reports completion message to the main system processor 112 by accessing the inter trigger 116, wherein the completion message indicates that the process of reading the second data is completed. When the processor 122 determines that the comparison result is not correct (i.e., the second hash value is not equal to the third hash value) ("No" in step S635), in step S650, the processor 122 invalidates the second data, and reports an error message to the main system processor 112 by accessing the inter trigger 116.

Figure 7:
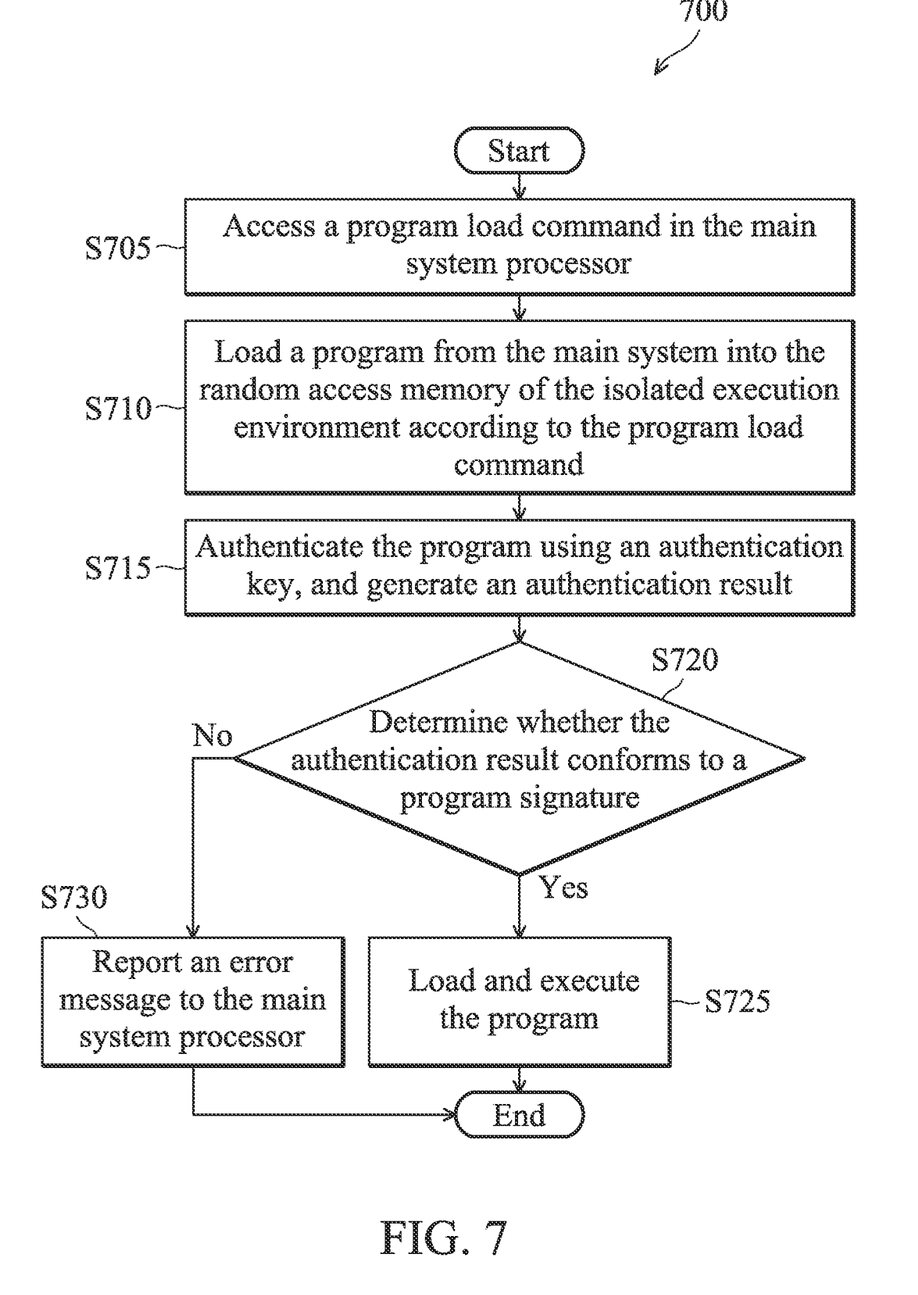
FIG. 7 shows a flowchart of a method for loading a program by a processor according to an embodiment of the present disclosure.

FIG. 7 shows a flowchart 700 of a method for loading a program by a processor according to an embodiment of the present disclosure. The method may be used in the isolated execution environment 120 of the system-on-a-chip 100 of FIG. 1.

In the present disclosure, the processor 122 in the isolated execution environment 120 executes programs stored in the non-volatile memory 128 of the isolated execution environment 120 by default. When the updated software and algorithms are loaded, the processor 122 in the isolated execution environment 120 may read the updated data from the main system 110 through the process of loading the program stored in the random access memory 128, wherein the updated data comprises a program data and a program signature, and the processor 122 executes the program when an authentication key is verified. The authentication key and the default program are stored in the non-volatile memory 128 in the isolated execution environment 120. The process of loading the program by the processor 122 is as follows:

In step S705, a processor 122 in the isolated execution environment 120 accesses a program load command in the main system processor 112. Specifically, the main system processor 112 first issues a program load command to notify the processor 122. The processor 122 accesses the program load command through the inter trigger 116.

In step S710, the processor 122 loads a program from the main system 110 into the random access memory 124 of the isolated execution environment 120 according to the program load command.

In step S715, the processor 122 authenticates the program using an authentication key, and generates an authentication result. In step S720, the processor 122 determines whether the authentication result conforms to a program signature.

When the processor 122 determines that the authentication result conforms to a program signature ("Yes" in step S720), in step S725, the processor 122 loads and executes the program. When the processor 122 determines that the authentication result does not conform to a program signature ("No" in step S720), in step S730, the processor 122 reports an error message to the main system processor 112 by accessing the inter trigger 116.

Figure 8:
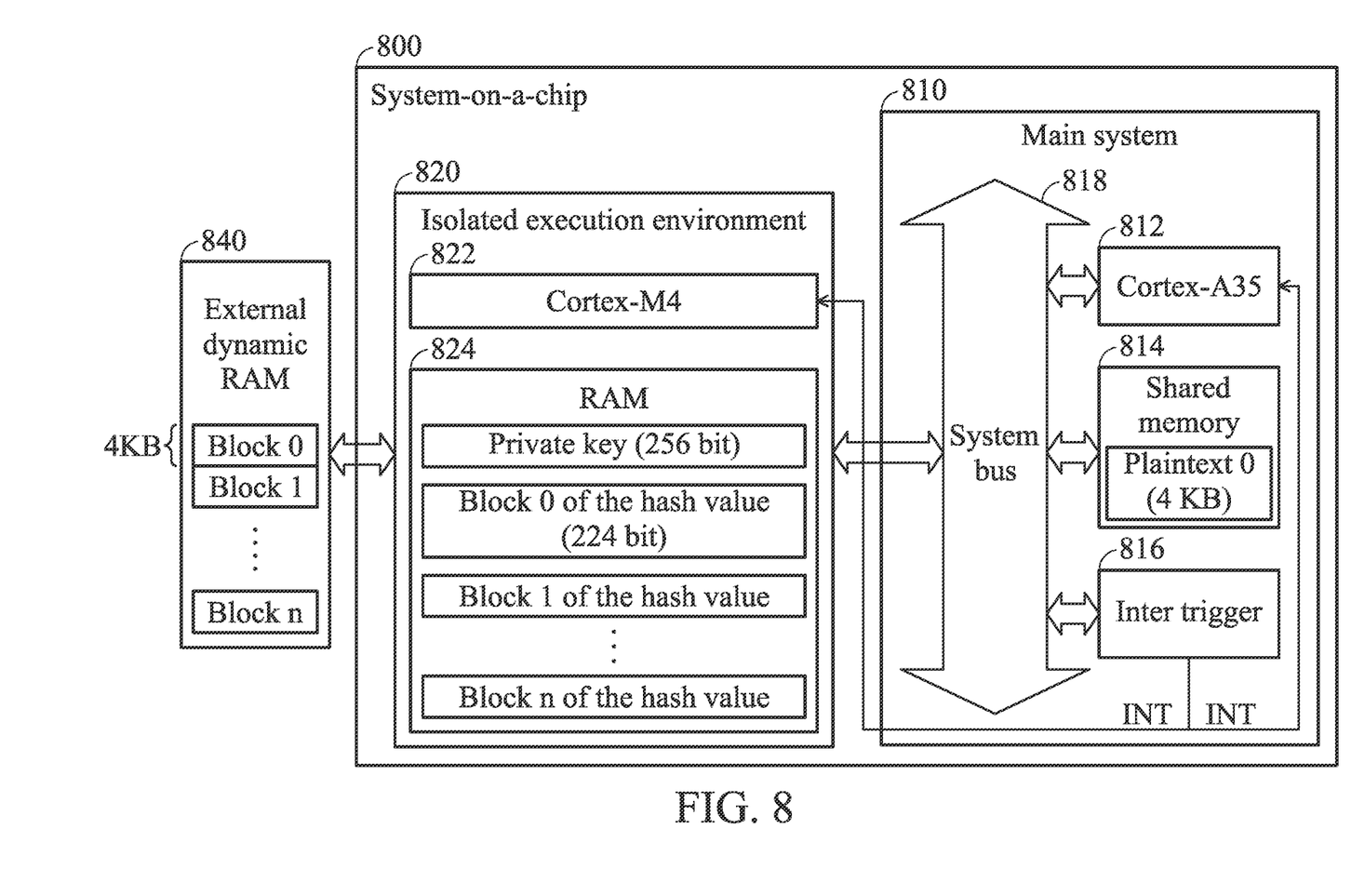
FIG. 8 is a schematic diagram illustrating an actual system-on-a-chip for protecting data in an external memory based on an isolated execution environment according to an embodiment of the present disclosure.

FIG. 8 is a schematic diagram illustrating an actual system-on-a-chip 800 for protecting data in an external memory based on an isolated execution environment according to an embodiment of the present disclosure. For the convenience of description, the main system 810 and the isolated execution environment 820 in the system-on-a-chip 800 only show some components. Those skilled in the art can understand that the main system 810 and the isolated execution environment 820 in FIG. 8 are the same as those in FIG. 1.

In the embodiment, the data block size in the shared memory 814 and the external dynamic random access memory (DRAM) 840 is defined as 4 Kbytes, an Arm Cortex-M4 is used as the processor in the isolated execution environment 820, and the encryption and decryption algorithm is executed by an AES-256, so the length of the private key is 256 bits. The hash algorithm is SHA-2 (224 bits), so the hash value which is stored in the random access memory of the isolated execution environment 820 and corresponds to each block of the external dynamic random access memory 840 occupies a 224-bit space. The Arm Cortex-A35 is used as the main processor in the main system 810, and the shared memory 814 in the main system 810 needs a space whose size is at least one block, i.e., 4 Kbytes. The inter trigger 816 in the main system 810 uses an interrupt signal (INT) to notify the processor Cortex-M4 822 in the isolated execution environment 820 and the main system processor Cortex-A35 812 in the main system 810, respectively.

Figure 9:
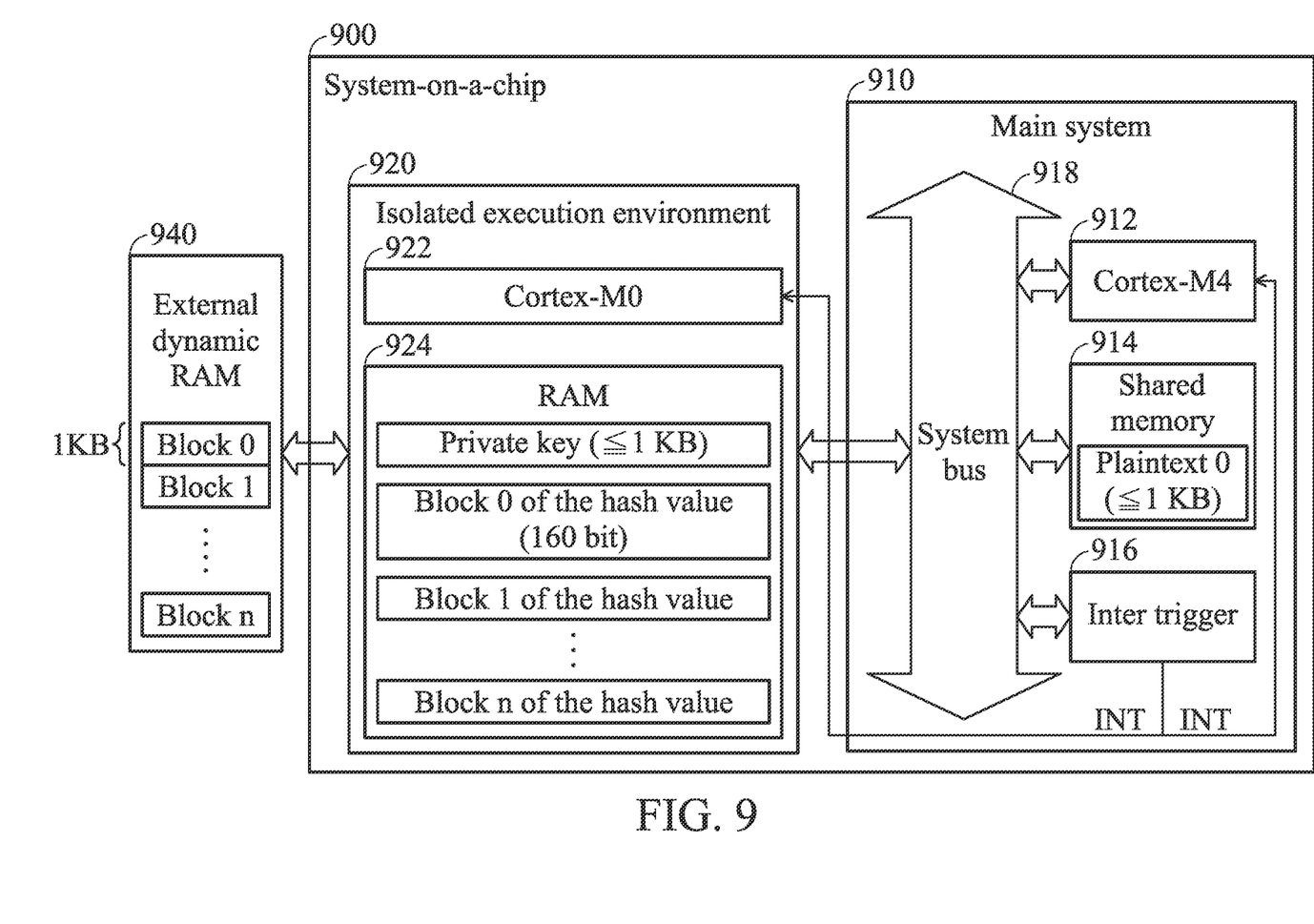
FIG. 9 shows a schematic diagram of an actual system for protecting data in an external memory based on an isolated execution environment according to an embodiment of the present disclosure.

FIG. 9 shows a schematic diagram of an actual system 900 for protecting data in an external memory based on an isolated execution environment according to an embodiment of the present disclosure. For the convenience of description, the main system 910 and the isolated execution environment 920 in the system 900 only show some components. Those skilled in the art can understand that the main system 910 and the isolated execution environment 920 in FIG. 9 are the same as those in FIG. 1.

In the embodiment, the data block size in the shared memory 914 and the external dynamic random access memory (DRAM) 940 is defined as 1 Kbyte, an Arm Cortex-M0 is used as the processor in the isolated execution environment 920, and the encryption and decryption algorithm executed by the Arm Cortex-M0 is the data stream encryption algorithm RC4. The length of the private key can be defined as a value less than or equal to the block size. The hash algorithm is SHA-1 (160 bits), so the hash value which is stored in the random access memory 924 of the isolated execution environment 920 and corresponds to each block of the external dynamic random access memory 940 occupies a 160-bit space. The main system 910 uses an Arm Cortex-M4 as the main system processor 912, and the shared memory 914 in the main system 910 needs a space whose size is at least one block, i.e., 1 Kbytes. The inter trigger 916 in the main system 910 uses an interrupt signal (TNT) to notify the processor Cortex-M0 922 in the isolated execution environment 920 and the main system processor 914 Cortex-M4 in the main system 910, respectively.

As shown above, the method and system for protecting data in an external memory based on an isolated execution environment of the present disclosure provide another isolated execution environment in the system-on-a-chip, and further uses the hash value operation to provide data integrity checks. In addition, the hash value is stored in the isolated execution environment, which can effectively avoid being damaged by other malicious programs in the main system, and providing better security.

The methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application-specific logic circuits.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for protecting data in an external memory based on an isolated execution environment, used in a processor located in the isolated execution environment of a system-on-a-chip, comprising:
   accessing an output command of a main system processor in a main system of the system-on-a-chip;
   reading first data from a shared memory in the main system according to the output command;
   encrypting the first data with a private key and generating encrypted first data; and
   outputting the encrypted first data to the external memory;
   wherein the method further comprises:
   accessing a read command in the main system processor;
   reading encrypted second data from the external memory according to the read command;
   decrypting the encrypted second data using the private key to generate second data;
   sending the second data to the shared memory in the main system;
   calculating a second hash value of the second data;
   comparing the second hash value with a third hash value corresponding to the second data recorded in the random access memory, and generating a comparison result; and
   when the comparison result is incorrect, invaliding the second data and reporting an error message to the main system processor.

2. The method as claimed in claim 1, further comprising:
   calculating a first hash value of the first data; and
   recording the first hash value in the random access memory of the isolated execution environment.

3. The method as claimed in claim 1, wherein before the processor accesses the output command, the method further comprises:
   accessing an initialization command issued by the main system processor;
   accessing at least one true random number generator (TRNG) located in the isolated execution environment according to the initialization command to generate a random number;
   generating the private key according to the random number;
   storing the private key in the random access memory in the isolated execution environment; and
   reporting a completion message to the main system processor.

4. The method as claimed in claim 1, further comprising:
   accessing a program load command in the main system processor;
   loading a program from the host system into the random access memory of the isolated execution environment according to the program load command;
   authenticating the program using an authentication key and generating an authentication result; and
   loading and executing the program when the authentication result matches a program signature.

5. A system for protecting data in an external memory based on an isolated execution environment, comprising:
   a main system, comprising:
   a main system processor; and
   a shared memory, coupled to the main system processor; and
   an isolated execution environment, coupled to the main system, comprising:
   a processor;
   wherein the processor executes the following steps:
   accessing an output command of the main system processor;
   reading first data from a shared memory in the main system according to the output encrypting the first data with a private key and generating encrypted first data; and
   outputting the encrypted first data to the external memory;
   wherein the processor further executes the following steps:
   accessing a read command in the main system processor;
   reading encrypted second data from the external memory according to the read command;
   decrypting the encrypted second data using the private key to generate second data;
   sending the second data to the shared memory in the main system;
   calculating a second hash value of the second data;
   comparing the second hash value with a third hash value corresponding to the second data recorded in the random access memory, and generating a comparison result; and
   when the comparison result is incorrect, invaliding the second data and reporting an error message to the main system processor.

6. The system as claimed in claim 5, wherein the processor further executes the following steps:
   calculating a first hash value of the first data; and
   recording the first hash value in the random access memory of the isolated execution environment.

7. The system as claimed in claim 5, wherein before the processor accesses the output command, the processor further executes the following steps:
   accessing an initialization command issued by the main system processor;
   accessing at least one true random number generator (TRNG) located in the isolated execution environment according to the initialization command to generate a random number;
   generating the private key according to the random number;
   storing the private key in the random access memory in the isolated execution environment; and reporting a completion message to the main system processor.

\* \* \* \* \*